United States Patent [19]
Dent et al.

[11] Patent Number: 6,098,878
[45] Date of Patent: Aug. 8, 2000

[54] TARIFF MANAGEMENT APPARATUS AND METHOD FOR COMMUNICATIONS TERMINALS USING SMART CARDS

[75] Inventors: Paul Wilkinson Dent; Elizabeth Louise Humphreys, both of Pittsboro, N.C.

[73] Assignee: Ericsson Inc., Research Triangle Park, N.C.

[21] Appl. No.: 09/070,305

[22] Filed: Apr. 30, 1998

[51] Int. Cl.⁷ .............................. G06K 05/00; G06F 17/00
[52] U.S. Cl. ............................ 235/380; 235/375; 902/25; 902/26; 455/406; 455/407; 455/408; 455/409
[58] Field of Search .................................... 235/380, 375; 902/25, 26; 455/406, 407, 408, 409, 557, 558; 405/406, 407, 408

[56] References Cited

U.S. PATENT DOCUMENTS

| | | | |
|---|---|---|---|
| 4,264,956 | 4/1981 | Delaney | 364/467 |
| 4,751,728 | 6/1988 | Treat | 379/113 |
| 5,062,134 | 10/1991 | Laird | 379/131 |
| 5,107,494 | 4/1992 | Johnson et al. | 370/95.1 |
| 5,109,401 | 4/1992 | Hattori et al. | 379/58 |
| 5,317,545 | 5/1994 | Gray et al. | 368/4 |
| 5,497,411 | 3/1996 | Pellerin | 379/59 |
| 5,524,145 | 6/1996 | Parker | 379/197 |
| 5,577,100 | 11/1996 | McGregor et al. | 379/58 |
| 5,615,260 | 3/1997 | Kurgan | 379/433 |

(List continued on next page.)

FOREIGN PATENT DOCUMENTS

| | | |
|---|---|---|
| 0 647 055 A1 | 9/1994 | European Pat. Off. . |
| 0 724 371 A1 | 7/1996 | European Pat. Off. . |
| 0 734 144 A2 | 9/1996 | European Pat. Off. . |
| 0 808 073 A2 | 11/1997 | European Pat. Off. . |
| 195 23 143 A1 | 9/1996 | Germany . |
| 7-15564 | 1/1995 | Japan . |
| 94/28670 | 12/1994 | WIPO . |
| WO 94/28683 | 12/1994 | WIPO . |
| WO 95/28062 | 10/1995 | WIPO . |
| WO 96/24226 | 8/1996 | WIPO . |
| WO 96/28947 | 9/1996 | WIPO . |
| WO 98/58512 | 12/1998 | WIPO . |

OTHER PUBLICATIONS

Copy of International Search Report for PCT/US99/08223.
International Search Report, PCT/US99/06916, Jul. 1, 1999.

*Primary Examiner*—Karl D. Frech
*Assistant Examiner*—Douglas X. Rodriquez
*Attorney, Agent, or Firm*—Myers Bigel Sibley & Sajovec

[57] ABSTRACT

Communication units used by a communications terminal are measured, and an economic efficiency associated with use of the terminal is determined from the measured communication units and a stored critical value of a tariff of a communications system that is stored in smart card that is coupled to the terminal. Measures to control communications unit usage by the terminal are initiated based on the determined economic efficiency. The measures to control usage may include providing an indication, e.g., a visual or audible indication, of the determined economic efficiency to a user of the terminal. According to one aspect, a first indication of economic efficiency is provided to the user, e.g., a first icon is displayed, if the measured communication units are less than the stored critical value, and a second indication of economic efficiency is provided to the user, e.g., a second icon is displayed, if the measured communication units are greater than the stored critical value. According to another aspect, measures to control usage may include altering usage of communication units by the terminal when the measured communication units exceed the stored critical value. The terminal may be disabled from communicating with the communications system if the measured communications units excess the stored critical value. Other measures may include disabling selected communications, e.g., disabling outward dialing, causing calls incoming to the terminal to be billed to an originating party, and reducing at least one of audio quality or video quality at the terminal. Disabling of such functions may be overridden by an input from a user.

28 Claims, 8 Drawing Sheets

U.S. PATENT DOCUMENTS

| | | | |
|---|---|---|---|
| 5,631,947 | 5/1997 | Wittstein et al. | 379/59 |
| 5,659,601 | 8/1997 | Cheslog | 455/406 |
| 5,761,624 | 6/1998 | Mooney et al. | 455/558 |
| 5,831,256 | 11/1998 | De Larminat et al. | 235/486 |
| 5,862,471 | 1/1999 | Tiedemann, Jr. et al. | 455/406 |
| 5,867,795 | 2/1999 | Novis et al. | 455/566 |
| 5,870,671 | 2/1999 | Martinez | 455/409 |
| 5,898,915 | 4/1999 | Reininghaus et al. | 455/406 |
| 5,915,214 | 6/1999 | Reece et al. | 455/406 |
| 5,915,226 | 6/1999 | Martineau | 455/558 |
| 5,933,785 | 8/1999 | Tayloe | 455/558 |

TARIFF MANAGEMENT APPARATUS AND METHOD FOR COMMUNICATIONS TERMINALS USING SMART CARDS

CROSS-REFERENCE TO RELATED APPLICATIONS

This application is related to application Ser. No. 08/888,229, filed Jul. 3, 1997, entitled "Tariff Management Apparatus and Methods for Communications Terminals", to Irvin, assigned to the assignee of the present application, and to application Ser. No. 09/070,289, filed concurrently, entitled "Tariff Management Apparatus and Methods for Multiple-Mode Communications Terminals", to the present inventors and assigned to the assignee of the present invention. The disclosures of both these applications are hereby incorporated herein by reference.

FIELD OF THE INVENTION

The present invention relates to communications systems and methods, in particular, to systems and methods for controlling costs associated with use of communications services.

BACKGROUND OF THE INVENTION

The cost of premium communication services such as cellular telephone or packet data services tends to be a significant impediment to universal use of these services. As a result, service providers regularly introduce new price schedules, often referred to as tariff options or outlay schedules to make these services more attractive to a wider group of consumers. Typically, these series of price schedules represent a series of so-called "Pareto" improvements, a new tariff option being a Pareto improvement over an established set of tariff options if at least one person is better-off economically and no one is worse off as result.

An ideal tariff structure generally would compute service charges ex post, i.e., the most economic tariff option would be used based on the customer's actual use during a particular billing cycle so that the customer would be charged the lowest amount supported by any one of the possible tariff options. In practice, however, complex tariffs are normally used to compute service charges ex ante, i. e., the customer pre-selects a tariff option based on expected traffic pattern and lives with the result, even though other options were available that would have resulted in lower service charges had they been selected ex post. Once a particular tariff option is chosen ex ante, the customer has little insight into the charges accruing, and is therefore exposed to the risk of incurring excessive charges. In addition, an unauthorized user, e.g., an overly talkative child or a thief who steals a cellular telephone to make unauthorized calls, may incur excessive charges under a tariff option selected by the primary user in expectation of low usage.

Unfortunately, cellular subscribers typically are limited in their ability to determine their status with respect to the tariff structure of the systems to which they subscribe. Conventional cellular radiotelephones provide mechanisms for measuring duration of a present call, for measuring and storing duration of a last call, for measuring and storing cumulative call duration, and for measuring and storing cumulative on-time. However, these parameters typically are not readily usable by the operator of the phone for determining usage with an eye to minimizing usage charges.

SUMMARY OF THE INVENTION

In light of the foregoing, it is an object of the present invention to provide improved systems and methods for controlling expenses incurred by a communications terminal.

It is another object of the present invention to provide systems and methods for controlling a communications terminal which reduce incurring of excess charges by an unauthorized user.

These and other objects, features and advantages are provided according to the present invention, by communications terminals and methods of operation therefor in which at least one critical value of tariff is stored in a smart card that is coupled to the communications terminal. The cumulative usage of communications units is measured for comparison to a stored critical value of a tariff in the smart card. Measures to control usage are initiated when the measured cumulative usage exceeds the stored critical value. The critical value may, for example, represent a breakpoint in a linearized tariff structure above which significantly higher charges are assessed for continued usage. The measures to control usage may include providing a display or other indication of the economic efficiency of usage of the terminal, as well as actions affecting operation of the terminal, such as blocking outgoing and incoming calls, disabling voice mail, invoking reverse-billing, reducing video and audio quality, and the like. Multiple critical values may be stored in the smart card, corresponding to different points in a tariff, and different measures may be taken when the cumulative usage exceeds these points. For example, a display or other indication may be provided in response to cumulative usage reaching a first critical value, with disabling of terminal functions occurring when cumulative usage exceeds a second critical value. According to other aspects, economic efficiency over a billing cycle may be forecast based on measured cumulative usage and the stored critical values from the smart card.

The smart card may be provided to the user of the communications terminal upon activation of the communications service. In addition to the critical values, the smart card may store a monthly cycle date to indicate when the monthly billing cycle begins, so that accumulated usage may be reset upon beginning a new monthly billing cycle. The smart card may store other information as well, including but not limited to security codes, user identifications and feature identifications. A monetary value that represents the amount of usage that was purchased may also be stored, similar to conventional prepaid telephone calling cards.

In particular, according to the present invention, a critical value which characterizes a tariff structure of a communications system is stored. Communication units used by a communications terminal are measured. An economic efficiency associated with use of the terminal is determined from the measured communication units and the stored critical value from the smart card. Measures to control communications unit usage by the terminal are initiated based on the determined economic efficiency. The measures to control usage may include providing to a user of the terminal an indication of the determined economic efficiency. The indication may be provided during a communication session between the terminal and the communications system, and may include producing at least one of a visible indication of economic efficiency and an audible indication of economic efficiency.

According to one aspect of the present invention, a first indication of economic efficiency is provided to the user if the measured communication units are less than the stored critical value. A second indication of economic efficiency is provided to the user if the measured communication units are greater than the stored critical value. Providing the first indication may include displaying a first icon, and providing the second indication may include displaying a second icon.

According to another aspect of the present invention, measures to control usage may include altering usage of communication units by the terminal when the measured communication units exceed the stored critical value. The terminal may be disabled from communicating with the communications system if the measured communications units exceeds the stored critical value. Other measures may include disabling selected communications, e.g., disabling outward dialing, causing calls incoming to the terminal to be billed to an originating party, and reducing at least one of audio quality or video quality at the terminal. Disabling of such functions may be overridden by accepting an enabling code input from a user and enabling the terminal for communications with the communications system in response to the input enabling code.

According to yet another aspect of the present invention, an apparatus for controlling expense incurred by a communications terminal includes a smart card that stores a critical value which characterizes a tariff structure of a communications system. The smart card is coupled to the communications terminal. Means are provided, responsive to the communications terminal, for measuring communication units used by the communications terminal. Means are provided, responsive to the means for measuring and to the smart card, for determining an economic efficiency associated with use of the terminal from the measured communication units and the stored critical value in the smart card. Means are also provided, responsive to the means for determining an economic efficiency, for initiating measures to control communications unit usage by the terminal based on the determined economic efficiency.

A communications terminal is also provided according to the present invention. Means are provided for communicating with a communications system. A smart card that is coupled to the terminal stores a critical value which characterizes a tariff structure of the communications system. Means are provided, responsive to the means for communicating, for measuring communication units used by the communications terminal. Means, responsive to the means for measuring and to the smart card, determine an economic efficiency associated with use of the terminal from the measured communication units and the stored critical value. Means, responsive to the means for determining an economic efficiency, initiate measures to control communications unit usage by the terminal based on the determined economic efficiency. Enhanced capabilities for controlling communications expenses are thereby provided.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

Figure 1:
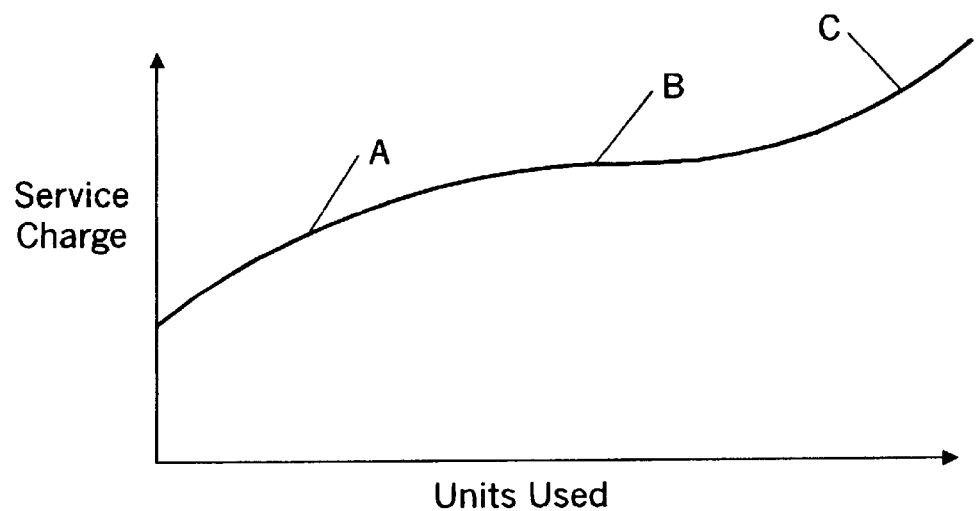
FIG. 1 is a graph illustrating a typical nonlinear communications tariff.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Although the description of the preferred embodiments herein refers to cellular telephony, the present invention is also applicable to communications systems other than cellular communications systems. For example, the present invention may be used with data communication services such as packet data or frame relay systems, wherein communications units are packet counts or frame counts rather than minutes-of-use. An embodiment of the present invention could therefore be usefully employed in, for example, a wireless telephone, a network-management application running on a data communication terminal such as a personal computer, laptop computer or personal digital assistant, and the like.

FIG. 1 illustrates a typical tariff structure or outlay function, in particular, a typical non-linear tariff. Message units, e.g., monthly cumulative minutes of cellular telephone use, are displayed along the horizontal axis; monthly service charge is displayed along the vertical axis. The tariff may be roughly divided into three regions: a convex region A, a concave region C, and a flat region B located between the curved regions A and B. According to economic theory, the curve shown in FIG. 1 represents a mathematical relationship known as the inverse elasticity rule for non-uniform pricing; at each point on the outlay schedule, the percentage markup between marginal cost and marginal price is inversely proportional to elasticity of demand with respect to marginal price. The y-intercept or offset shown in FIG. 1 may help to recover the fixed costs of providing service, and, if elevated above that recovery level, to recapture a portion of consumer surplus.

Viewed another way, the convex region A of FIG. 1 offers an operating range attractive to casual users and flat region B offers an operating range attractive to high-volume users, while concave region C discourages system overload and arbitrage. The kind of tariff structure illustrated in FIG. 1 appears to be well-grounded in economic theory and supported by empirical data, and therefore may continue to be used as communications services continue to evolve.

Figure 2:
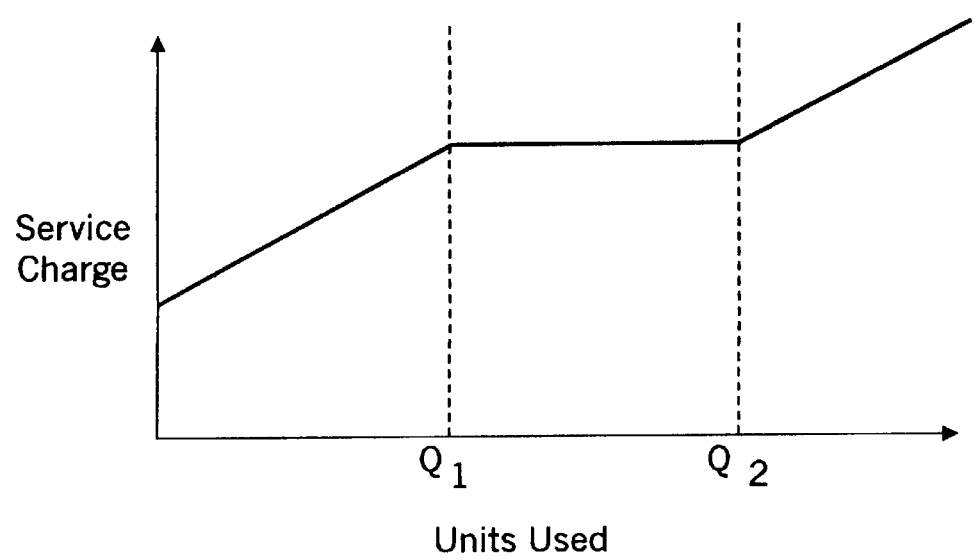
FIG. 2 is a graph illustrating a typical multi-part communications tariff.

However, because the general population is typically unable to intuitively grasp a nonlinear tariff having a continuous first derivative, service providers typically employ a piecewise linear approximation to a nonlinear tariff, as illustrated in FIG. 2. This kind of segmented tariff structure is commonly called a multi-part tariff; for example, the tariff structure of FIG. 2 represents a four-part tariff.

Figure 3:
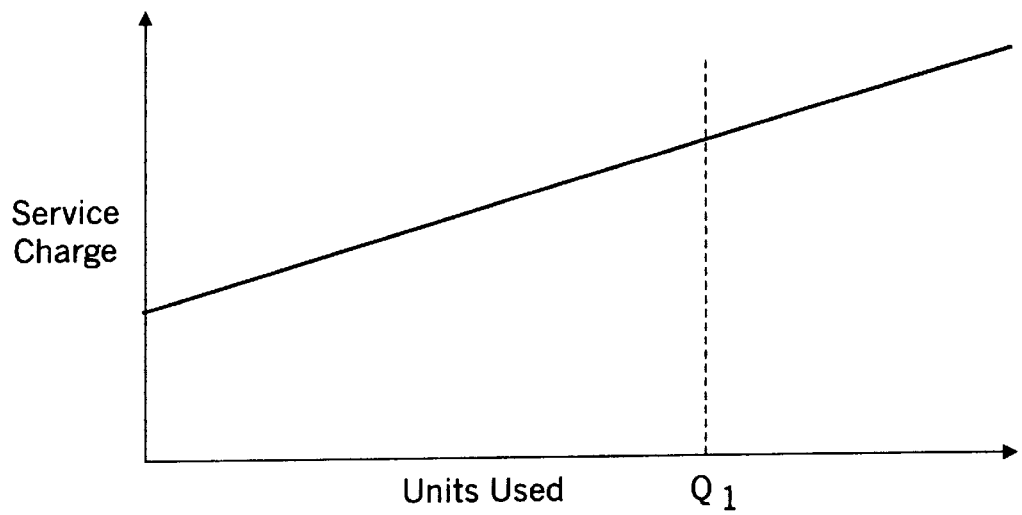
FIGS. 3 and 4 are graphs illustrating other types of multi-part communications tariffs.
Figure 4:
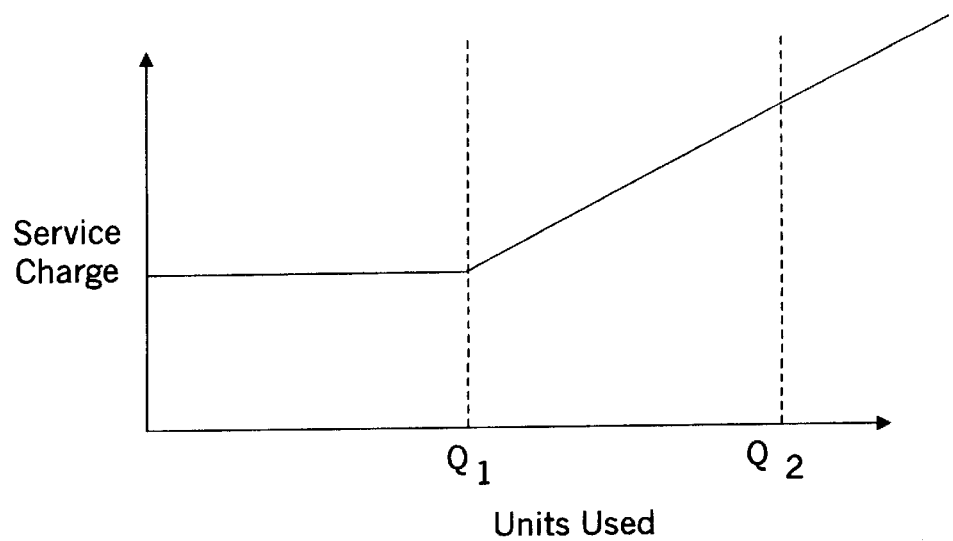

Within a multi-part tariff, there are certain critical values at which the pricing schedule changes its nature. These values are represented by the points $Q_1$ and $Q_2$. Because of the linear nature of a multi-part tariff, a knowledge of these values can fully characterize the outlay schedule. As other examples, FIGS. 3 and 4 show a two-part tariff and a three-part tariff, respectively, along with appropriate critical points. In these figures, the critical values $Q_1$ and $Q_2$ may represent pre-determined budget constraints unrelated to the tariff per se.

Figure 5:
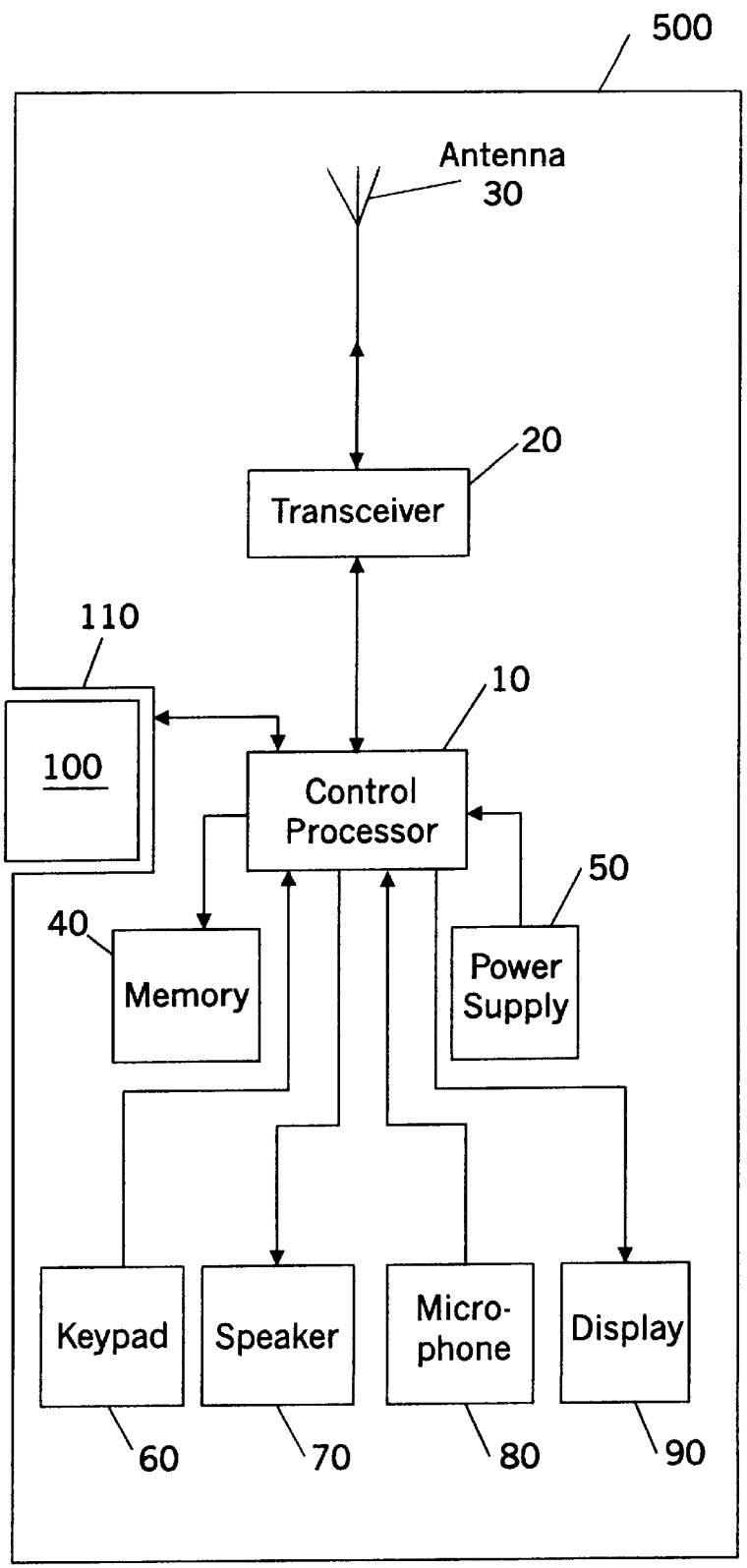
FIGS. 5 and 6 are schematic illustrations of a radiotelephone apparatus in which the present invention may be practiced.
Figure 6:
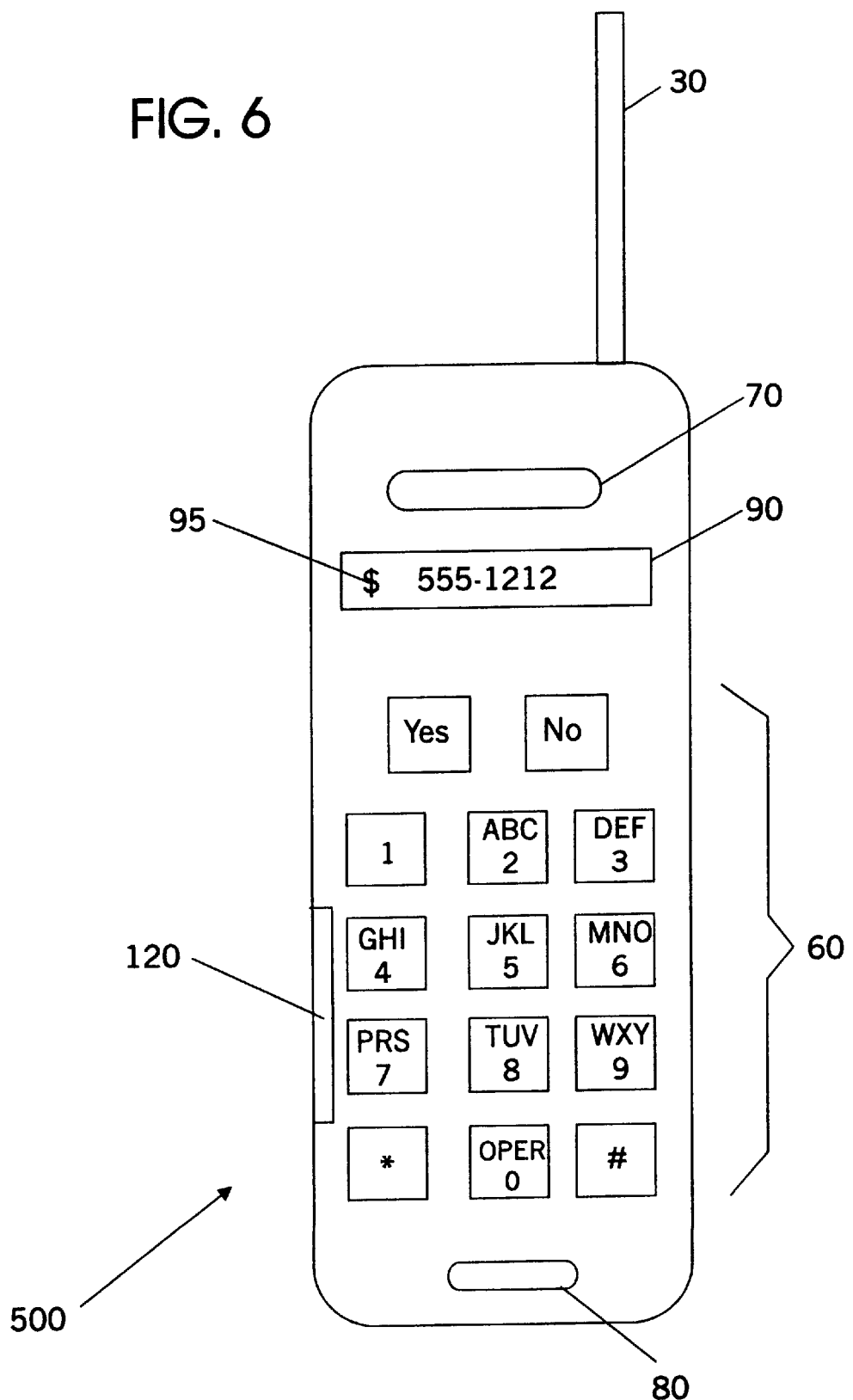

Those skilled in the art will appreciate that the apparatus and operations of the present invention may be implemented using a communications terminal such the cellular radiotelephone 500 illustrated in FIGS. 5 and 6. The radiotelephone 500 includes a control processor 10, e.g., a microprocessor, which controls operations of a transceiver 20 which is operative to send and receive communications signals via an antenna 30. The control processor 10 is operatively associated with memory 40, e.g., random access memory (RAM), programmable read only memory (PROM) and the like, for storage of operating programs and data. Power supply 50 supplies power to the control processor 10 and other elements of the radiotelephone 500. The control processor 10 also is operatively associated with a keypad 60, a speaker 70, a microphone 80 and a display 90. As illustrated in FIG. 6, the display 90 may include one or more graphical fields 95.

Control processor 10 may include a real-time clock-calendar program or low power chip for identifying the start of a billing cycle. The real-time clock-calendar may be set manually by the user with the aid of the keypad and display. Alternatively, the real-time clock-calendar may be synchronized automatically with the network by receiving broadcast information from the network. As yet another alternative, the network may directly broadcast an indication of the start of a new billing cycle. The billing cycle may start at different times for different groups of subscribers, in which case the network may address such broadcasts to particular subscribers or groups of subscribers.

As also shown in FIGS. 5 and 6, a smart card 100 is coupled to control processor 10 via smart card interface 110. The design of smart card 100 and smart card interface 110 are well known to those having skill in the art and need not be described further herein. Smart card 100 may be inserted in radiotelephone 500 via slot 120 or other conventional means.

FIGS. 7–10B are flowchart illustrations of methods and apparatus which may be implemented on a communications terminal such as the radiotelephone 500 illustrated in FIG. 5. It will be understood that each block of the flowchart illustrations, and combinations of blocks in the flowchart illustrations, can be implemented by computer program instructions. These computer program instructions may be loaded onto a computer or other programmable data processing apparatus, e.g., the control processor 10 of the radiotelephone 500, to produce a machine such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 7:
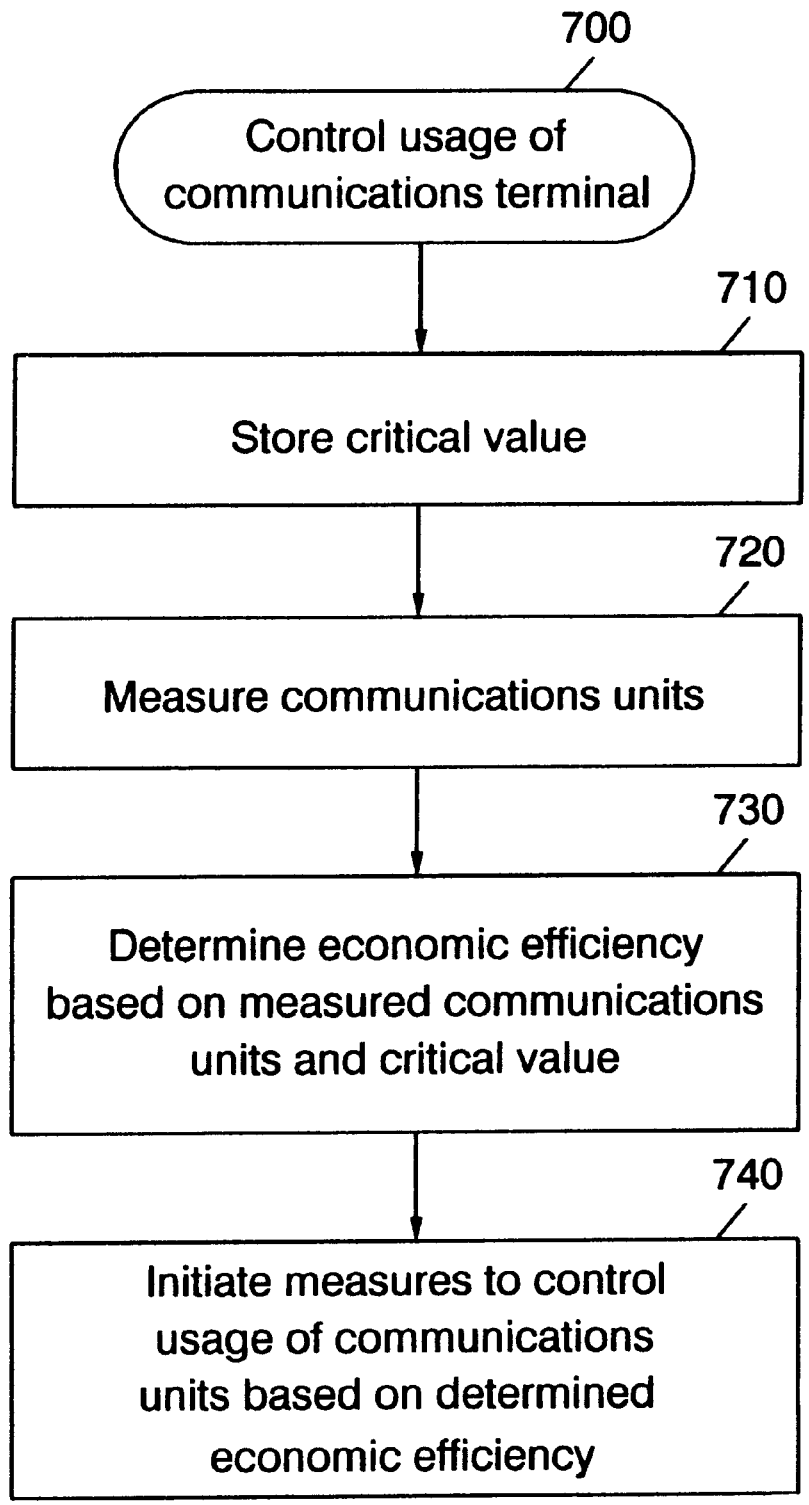
FIGS. 7–10B are flowchart illustrations of operations for controlling usage of a communications terminal according to the present invention.

FIG. 7 illustrates operation for controlling usage of a communications terminal according to the present invention (Block 700). One or more critical values for a communications tariff are stored in smart card 100 (Block 710). The terminal communicates with a communications system, e.g., sends or receives voice information or data packets, with the communications units used during communications being measured (Block 720). An economic efficiency is determined based on the stored critical values and the measured communications units (Block 730). Measures are initiated to control communications unit usage by the terminal based on the determined economic efficiency (Block 740).

It will be understood that smart card 100 may store other information that is used by radiotelephone 500, including but not limited to encryption keys, user identification and stored values indicating the value of communications services that were purchased. Moreover, the smart card preferably stores a monthly billing cycle start-up date, so that cumulative usage values may be reset at the start of a billing cycle.

It will also be understood that by initiating measures for controlling communications unit usage, the description herein refers to a variety of actions which may cause usage of the terminal to be terminated or curtailed, either by the user or automatically. For example, a display may be provided to a user of the terminal which indicates the determined economic efficiency associated with operation of the terminal. The user may respond to this indication in various ways, such as by terminating a communications session, or by disregarding the indication and continuing to use the terminal. Automatic measures may also be included which are not subject to user control, such as disabling of dialing or other features of the terminal.

Figure 8:
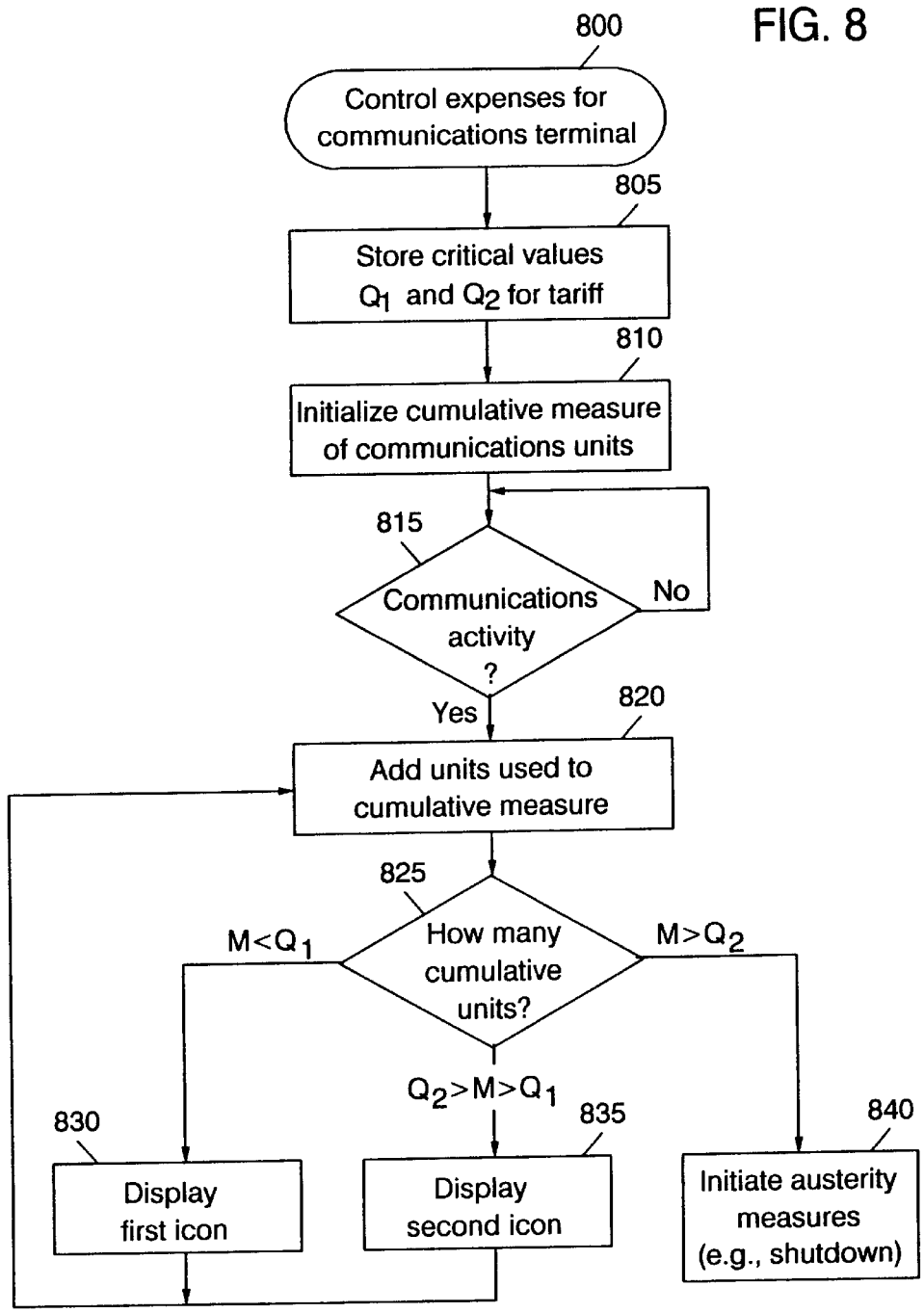

FIG. 8 illustrates operation for controlling expenses incurred by a communication terminal according to a preferred aspect of the present invention (Block 800). First and second critical values $Q_1$ and $Q_2$ for a tariff are stored in the smart card (Block 805). A cumulative measure of communications unit usage is initialized, e.g., set to zero at the beginning of a billing cycle (Block 810). The billing cycle date is also preferably stored in the smart card, and is used to determine when initialization should take place. When communications activity occurs (Block 815), the units used are added to the cumulative measure of communications unit usage (Block 820). If the number of cumulative units is less than the first critical value $Q_1$, a first icon is displayed on a display of the terminal (Block 830). If the cumulative units used are greater than the first critical value $Q_1$ but less than the second critical value $Q_2$, a second icon is displayed (Block 835). If the cumulative units used exceed the second critical value $Q_2$, additional austerity measures may be initiated, such as blocking of the terminal's capacity to place calls (Block 840).

Those skilled in the art will appreciate that a variety of indications of economic efficiency may be used. For example, different symbols may be displayed in one of the fields 95 of the display 90 of the radiotelephone of FIGS. 5 and 6 to indicate different levels of economic efficiency. For example, if usage is below the first critical value $Q_1$, a "$" might be displayed to indicate relatively low cost operation. The display may change to display a "$" when usage exceeds the first critical value $Q_1$, indicating increase operational cost. Those skilled in the art will appreciate, however, that many other indications may be used, such as audible alarms or visual indications other than icons.

Those skilled in the art will also appreciate that a variety of austerity measures may be initiated when usage exceeds an undesirably high level. Austerity measures may include various types of call-blocking such as blocking all inbound calls, all outbound calls, inbound or outbound calls to certain numbers, and the like; reverse-billing measures that return the service charge to a call originator; blocking auto-answer features, voice-mail-recording features and the like. In data communications applications, austerity measures may include the above-described measures with regard to source or destination addresses, while in multimedia or video applications, austerity measures may also include reductions in video or audio quality. According to another aspect of the present invention, these austerity measures may be overridden by an appropriate action by a user of the terminal. Thus, an unauthorized user may be blocked from running up excessive charges, but an authorized user may re-enable operation of features by, for example, entering a appropriate password.

Those skilled in the art will appreciate that the above-described indications of economic efficiency and austerity measures may be used alone or in combination. In addition, the above-described operations may be performed at various times in relation to communications session at the terminal. For example, the indication of economic efficiency may be displayed prior to an attempted call to deter a user from placing the call. A warning icon or audible indication may also be provided during a call, for example, to allow the user to wrap up the session and avoid excessive charges.

Figure 9:
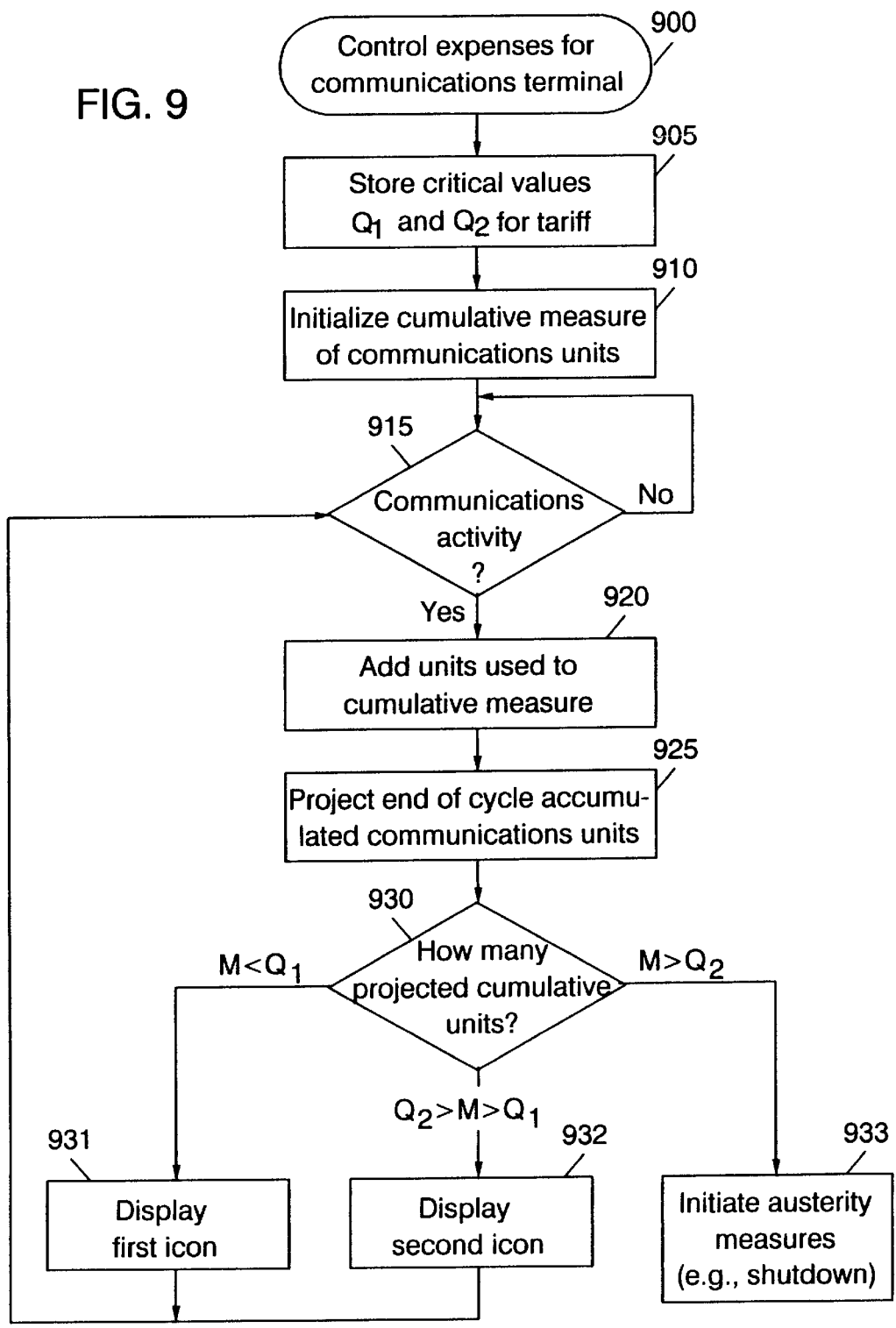

FIG. 9 illustrates operations for controlling expenses incurred by a terminal according to an aspect of the invention which allows the user to control use of a terminal based on a projected usage during a billing cycle (Block 900). Critical values $Q_1$ and $Q_2$ are stored in smart card 100 (Block 905), and a measure of cumulative units used by the terminal is initialized (Block 910). The billing cycle date is also preferably stored in the smart card and is used to determine when initialization should take place. Initialization will be described in detail in connection with FIGS. 10A and 10B below.

Upon initiation of communications activity (Block 915), units used are added to the cumulative measure of communications units (Block 920). Instead of displaying current usage, however, projected cumulative units for the billing cycle are determined (Block 925). For example, projected usage may be determined by computing an average rate over the time period during which the cumulative units are used, multiplying this average usage rate by the amount of time remaining in the billing cycle and adding the result to the current measure of cumulative units used to provide a projection of usage during a billing cycle. The projected cumulative units may then be compared to the critical values of the tariff (Block 930). If the projected usage is less than the first critical value $Q_1$, a first icon may be displayed to indicate that the terminal is likely to operate within a more economical tariff region for the billing cycle (Block 931). If the projected usage is greater than the first critical value $Q_1$ and less than the second critical value $Q_2$, a second icon may be displayed to indicate an increased risk of less economical operation during the billing cycle (Block 932). If the projected usage exceeds the second critical value $Q_2$, austerity measures may be initiated (Block 933), thus providing a "forced discipline" on the user and ensuring that the terminal is operated in an economical manner. As with the aspects described above, a variety of indications of projected economic efficiency may be used, including icons and other visual indication, audible alarms, and the like. Similarly, a variety of austerity measures may be initiated, including the feature-disabling measures described above, which may be overridden by appropriate user actions. The efficiency indicators and austerity measures may be used alone or in combination.

Figure 10A:
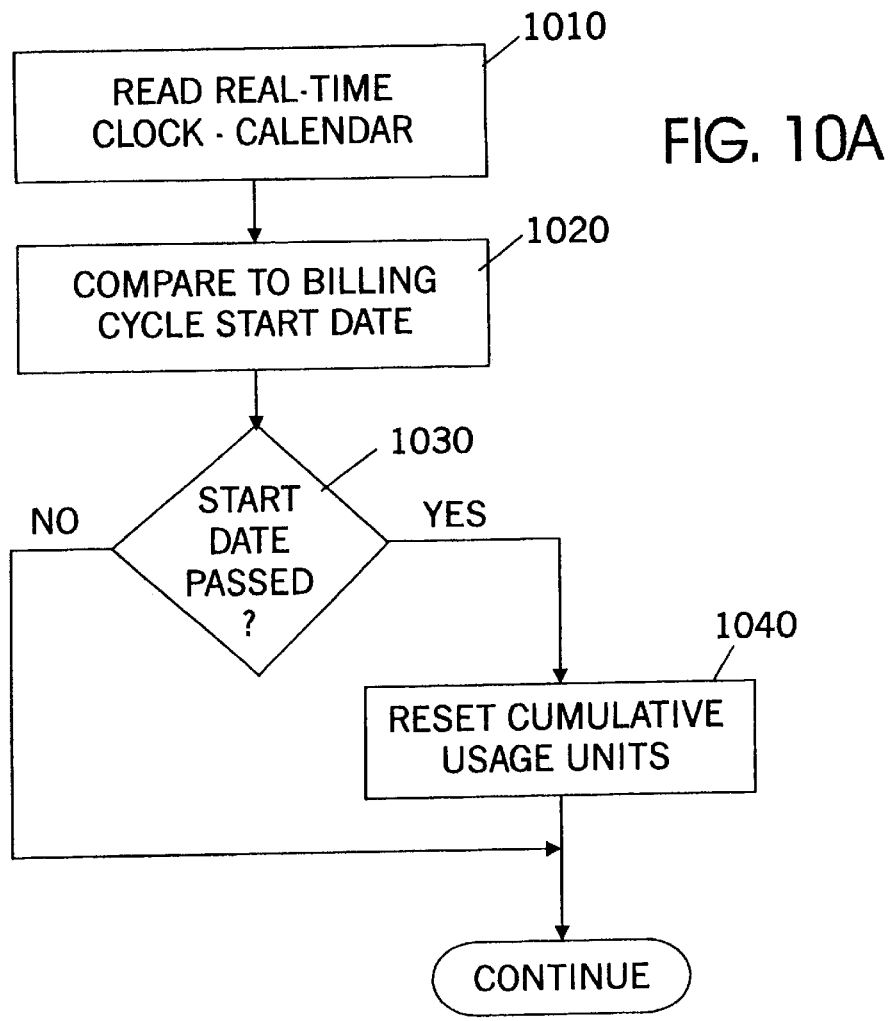
Figure 10B:
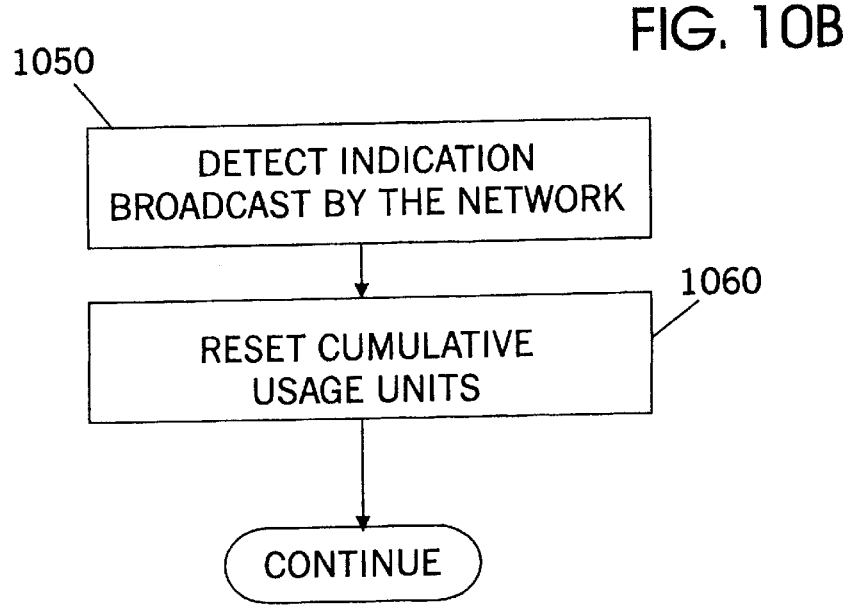

Referring now to FIGS. 10A and 10B, initialization of cumulative communications units (Block 910 of FIG. 9) will now be described. Referring to FIG. 10A, the real-time clock calendar contained in the telephone is used to obtain the current data and time (Block 1010). This is compared with a date and optionally a time, that indicates the start of a new billing cycle, at Block 1020. The date/time of the start of a billing cycle may, for example, have been provided with other subscription information by the service provider in the smart card issued by the service provider. If the current date/time is later than that of the billing cycle start (Block 1030), then the cumulative number of usage units is reset (Block 1040). Operations then continue. The cumulative number previously used may be archived in memory rather than discarded, to provide the user with a check against the bill the user receives.

There are various ways to indicate the start of a billing cycle. For example, it may be indicated as a fixed day of the month, such as the first or fifteenth. The last day of the month depends on the month, so another alternative is to indicate a billing cycle schedule for a whole year when a fixed day of the month is not used.

If a fixed day of the month is used to indicate the start of a billing cycle, then the telephone preferably stores an indication whether the billing cycle for the previous month has been passed and the number of cumulative usage units reset, or not, in order to allow resetting only once when the date is passed.

An alternative, shown in FIG. 10B is for the network to provide an indication of the start of a new billing cycle (Block 1050). Cumulative usage units are reset in response to detection of the indication, at Block 1060. Unfortunately, detection of the indication may be complicated because mobile phones may roam far outside of their home areas and communicate via various networks. One solution to this problem will now be described.

In the GSM system, also known as PCS1900 in the United States, smart cards are provided by the service provider to the subscriber. The smart cards contain electronically stored authentication keys for anti-fraud protection, among other features. The smart card is inserted into the phone to provide the phone with its "identify", including its International Mobile Station Identify (IMSI) which is its mobile telephone number. The authentication key stored in the smart card cannot be read out or duplicated, and the only other copy of the authentication key is stored in the subscriber's Home Location Register (HLR) which is owned and protected by the subscription provider.

When a mobile phone has roamed to a different network, the visited network determines if the phone is a valid phone with a valid billing address. The phone sends its IMSI to the visited network and the visited network determines the home network, and contacts the home network. The home network sends a "Random Challenge" to the visited network for relay to the phone. The phone receives the random challenge via the visited network and applies it to an electrical input of its smart card. The smart card combines the random challenge with the stored authentication key and generates a response and a temporary ciphering key. The response is sent to the visited network. The Home network also combines the random challenge with the other copy of the authentication key that is stored in the HLR against that IMSI. By comparing the response sent by the phone with the response calculated by the home network, the mobile phone may be verified to be genuine if the responses match. The home network releases the temporary ciphering key to the visited network for use in communicating with that phone.

In order to reduce the incidence of international information exchanges that are associated with the above transactions, it is common practice for the home network to release bundles of "Security Triplets" to a visited network, each triplet including a Random Challenge; the expected response associated with the Random Challenge; and a temporary ciphering key associated with the Random Challenge. In this way, a visited network can conduct multiple authentications with a mobile phone before needing to make another long distance contact with the home network.

One implementation of the present invention may attach a flag to a security triplet to indicate to the remote phone that, after it has been authenticated using that triplet, a new billing cycle will have begun. Thus, the billing cycle reset indication may be piggybacked on other information that is routinely exchanged between remote networks and the home network when a phone is roaming.

Those skilled in the art will appreciate that the methods and apparatus of flowchart illustrations 7–10B may be implemented, for example, using a communications terminal such as the radiotelephone 500 of FIG. 5. For example, the critical values for a communications tariff may be stored in the smart card 100 that is coupled to the radiotelephone 500 via smart card interface 110. The control processor 10 may perform computations of cumulative communications units usage and projected usage based on information received from the transceiver 20, and may compare these computed values with the critical values stored in the smart card. The comparison may also take place by storing the critical value from the smart card 100 into the memory 40 and using the critical value stored in the memory 40 for comparison. The control processor 10 may also cause the appropriate indications of economic efficiency by way of the display 90 or the speaker 70, for example. The control processor 10 may also initiate austerity measures in response to undesirably high usage, such as disabling portions of the transceiver 20.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of controlling expense incurred by a communications terminal that is subject to a billing cycle tariff structure that repeatedly restarts on a billing cycle date, and that is operative to communicate with a communications system the method comprising the steps of:

storing a critical value which characterizes the billing cycle tariff structure and the billing cycle date in a smart card that is coupled to the communications terminal;

measuring communication units used by the communications terminal in a current billing cycle;

determining an economic efficiency associated with use of the terminal in the current billing cycle from the measured communication units, the stored critical value which characterizes the billing cycle tariff structure and the billing cycle date in the smart card;

disabling the terminal from communicating with the communications system during the current billing cycle when the measured communication units during the current billing cycle exceed the stored critical value;

accepting an enabling code input from a user; and enabling the terminal for communications with the communications system during the current billing cycle in response to the input enabling code.

2. A method according to claim 1 wherein the step of storing a critical value comprises the step of storing a number of free monthly minutes that is allowed under the tariff structure of a communications system, in a smart card that is coupled to the communications terminal.

3. A method according to claim 1, wherein the storing step further comprises the step of storing user identification information and security information in the smart card that is coupled to the communications terminal.

4. A method according to claim 1 wherein the following step is performed between the steps of storing a critical value and measuring communication units:

comparing a billing cycle start date to a present date, to initialize a cumulative measure of communication units for the current billing cycle.

5. A method according to claim 4 wherein the comparing step is preceded by the steps of:

storing the billing cycle start date in the smart card that is coupled to the communications terminal; and obtaining a present date from a real time clock in the communications terminal.

6. A method according to claim 4 wherein the comparing step is preceded by the steps of:

storing the billing cycle start date in the smart card that is coupled to the communications terminal; and obtaining a present date from user input to the communications terminal.

7. A method according to claim 4 wherein the comparing step is preceded by the step of:

obtaining a billing cycle start date from the communications system that communicates with the communications terminal.

8. A method according to claim 7 wherein the obtaining step comprises the step of obtaining the billing cycle start date from a security communication from the communications system that communicates with the communications terminal.

9. A method of controlling expense incurred by a communications terminal that is subject to a billing cycle tariff structure that repeatedly restarts on a billing cycle date the method comprising the steps of:

storing a critical value which characterizes the billing cycle tariff structure and the billing cycle date in a smart card that is coupled to the communications terminal;

measuring communication units used by the communications terminal in a current billing cycle;

determining an economic efficiency associated with use of the terminal in the current billing cycle from the measured communication units, the stored critical value which characterizes the billing cycle tariff structure and the billing cycle date in the smart card; and altering usage of communication units by the terminal when the measured communication units during the current billing cycle exceed the stored critical value by causing calls incoming to the terminal during the current billing cycle to be billed to an originating party.

10. An apparatus for controlling expense incurred by a communications terminal that is subject to a billing cycle tariff structure that repeatedly restarts on a billing cycle date, and that is operative to communicate with a communications system, the apparatus comprising:

a smart card that stores a critical value which characterizes the billing cycle tariff structure;

means for coupling the smart card to the communications terminal;

means, responsive to the communications terminal, for measuring communication units used by the communications terminal in a current billing cycle;

means, responsive to said means for measuring and to said smart card, for determining an economic efficiency associated with use of the terminal in the current billing cycle from the measured communication units, the stored critical value which characterizes the billing cycle tariff structure and the billing cycle date;

means, responsive to said means for determining an economic efficiency, for disabling the terminal from communicating with the communications system during the current billing cycle where the measured communication units during the current billing cycle exceed the stored critical value;

means for accepting an enabling code input from a user; and means for enabling the terminal for communications with the communications system during the current billing cycle in response to the input enabling code.

11. An apparatus for controlling expense incurred by a communications terminal that is subject to a billing cycle tariff structure that repeatedly restarts on a billing cycle date, and that is operative to communicate with a communications system, the apparatus comprising:

a smart card that stores a critical value which characterizes the billing cycle tariff structure;

means for coupling the smart card to the communications terminal;

means, responsive to the communications terminal, for measuring communication units used by the communications terminal in a current billing cycle;

means, responsive to said means for measuring and to said smart card, for determining an economic efficiency associated with use of the terminal in the current billing cycle from the measured communication units, the stored critical value which characterizes the billing cycle tariff structure and the billing cycle date, and means for altering usage of communication units by the terminal when the measured communication units during the current billing cycle exceed the stored critical value by causing calls incoming to the terminal during the current billing cycle to be billed to an originating party.

12. An apparatus according to claim 11 wherein the critical value comprises a number of free monthly minutes that is allowed under the tariff structure of the communications system.

13. An apparatus according to claim 11 wherein the smart card also stores user identification information and security information.

14. An apparatus according to claim 11, wherein said means for initiating comprises means for providing to a user of the terminal an indication of the determined economic efficiency during the current billing cycle.

15. An apparatus according to claim 11 further comprising:

means for comparing a billing cycle start date to a present date, to initialize a cumulative measure of communication units during the current billing cycle.

16. An apparatus according to claim 15 wherein the comparing means comprises:

means for storing the billing cycle start date in the smart card; and means for obtaining a present date from a real time clock in the communications terminal.

17. An apparatus according to claim 15 wherein the comparing means comprises:

means for storing the billing cycle start date in the smart card; and means for obtaining a present date from user input to the communications terminal.

18. An apparatus according to claim 15 wherein the comparing means comprises:

means for obtaining a billing cycle start date from the communications system that communicates with the communications terminal.

19. An apparatus according to claim 18 wherein the obtaining means comprises:

means for obtaining the billing cycle start date from a security communication from the communications system that communicates with the communications terminal.

20. A communications terminal that is subject to a billing cycle tariff structure that repeatedly restarts on a billing cycle date, the communications terminal comprising:

a transceiver that communicates with a communications system;

a smart card that stores a critical value which characterizes the billing cycle tariff structure of the communications system;

a smart card coupler;

a control processor that is responsive to the smart card coupler and that measures communication units used by the communications terminal in a current billing cycle, that determines an economic efficiency associated with use of the terminal in the current billing cycle from the measured communication units, the stored critical value which characterizes the billing cycle tariff structure and the billing cycle date that disables selected communications during the current billing cycle when the measured communication units during the current billing cycle exceed the stored critical value, that accepts an enabling code input from a user and that enables the terminal for communications with the communications system during the current billing cycle in response to the input enabling code.

21. A terminal according to claim 20 wherein the critical value comprises a number of free monthly minutes that is allowed under the tariff structure of the communications system.

22. A terminal according to claim 20 wherein the smart card also stores user identification information and security information.

23. A terminal according to claim 20, wherein said control processor further compares a billing cycle start date to a present date, to initialize a cumulative measure of communication units for the current billing cycle.

24. A terminal according to claim 23 wherein said control processor compares by:

storing the billing cycle start date in the smart card; and obtaining a present date from a real time clock in the communications terminal.

25. A terminal according to claim 23 wherein said control processor compares by:

storing the billing cycle start date in the smart card; and obtaining a present date from a user input to the communications terminal.

26. A terminal according to claim 23 wherein the control processor compares by:

obtaining a billing cycle start date from the communications system.

27. A terminal according to claim 26 wherein said control processor compares by:

obtaining the billing cycle start date from a security communication from the communications system.

28. A communications terminal that is subject to a billing cycle tariff structure that repeatedly restarts on a billing cycle date, the communications terminal comprising:

a transceiver that communicates with a communications system;

a smart card that stores a critical value which characterizes the billing cycle tariff structure of the communications system;

a smart card coupler;

a control processor that is responsive to the smart card coupler and that measures communication units used by the communications terminal in a current billing cycle that determines an economic efficiency associated with use of the terminal in the current billing cycle from the measured communication units, the stored critical value which characterizes the billing cycle tariff structure and the billing cycle date and that alters usage for communication units by the terminal when the measured communication units during the current billing cycle exceed the stored critical value by causing calls incoming to the terminal during the current billing cycle to be billed to an originating party.

* * * * *